United States Patent
Woo et al.

(10) Patent No.: US 6,954,837 B2
(45) Date of Patent: *Oct. 11, 2005

(54) CONSOLIDATION OF ALLOCATED MEMORY TO REDUCE POWER CONSUMPTION

(75) Inventors: Steven C. Woo, Saratoga, CA (US); Pradeep Batra, Santa Clara, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/823,115

(22) Filed: Apr. 12, 2004

(65) Prior Publication Data

US 2004/0193829 A1 Sep. 30, 2004

Related U.S. Application Data

(63) Continuation of application No. 09/919,373, filed on Jul. 30, 2001, now Pat. No. 6,742,097.

(51) Int. Cl.[7] .............................................. G06F 12/00
(52) U.S. Cl. ........................ 711/170; 711/5; 711/165; 711/203; 711/209
(58) Field of Search ........................... 711/5, 158, 165, 711/170, 202, 203, 206, 209

(56) References Cited

U.S. PATENT DOCUMENTS

| | | |
|---|---|---|
| 5,603,000 A | 2/1997 | Lee et al. |
| 5,687,382 A | 11/1997 | Kojima et al. |
| 5,706,407 A | 1/1998 | Nakamura et al. |
| 5,787,498 A | 7/1998 | Lee et al. |
| 6,167,484 A | 12/2000 | Boyer et al. |
| 6,215,714 B1 | 4/2001 | Takemae et al. |
| 6,415,366 B1 | 7/2002 | Chen et al. |
| 6,430,665 B1 | 8/2002 | Allison et al. |
| 2002/0019896 A1 | 2/2002 | Fornaciari et al. |
| 2002/0186597 A1 | 12/2002 | Henkel et al. |
| 2003/0051108 A1 | 3/2003 | Chen et al. |

OTHER PUBLICATIONS

"Memory Data Book", Micron Technology, pp. 1–77 to 1–80, Feb. 1999.
"Power Aware Page Allocation", Lebeck et al., ACM, Nov. 2000, 12 pages.
"Optimizing the DRAM Refresh Count for Merged DRAM/Logic LSIs", Ohsawa et al., ISLPED, Aug. 10–12, 1998, pp. 82–87.

Primary Examiner—Kevin Verbrugge
(74) Attorney, Agent, or Firm—Shemwell Gregory & Courtney LLP (57) ABSTRACT

A memory system includes physical memory devices or ranks of memory devices that can be set to reduced power modes. In one embodiment, a hardware memory controller receives memory instructions in terms of a logical address space. In response to the relative usages of different addresses within the logical address space, the memory controller maps the logical address space to physical memory in a way that reduces the number of memory devices that are being used. Other memory devices are then set to reduced power modes. In another embodiment, an operating system maintains a free page list indicating portions of physical memory that are not currently allocated. The operating system periodically sorts this list by group, where each group corresponds to a set or rank of memory devices. The groups are sorted in order from those receiving the heaviest usage to those receiving the lightest usage. When allocating memory, the memory is allocated from the sorted page list so that memory is preferentially allocated from those memory devices that are already receiving the highest usage.

37 Claims, 3 Drawing Sheets

CONSOLIDATION OF ALLOCATED MEMORY TO REDUCE POWER CONSUMPTION

CROSS-REFERENCES TO RELATED APPLICATIONS

This U.S. Nonprovisional Patent Application is a continuation of Application No. 09/919,373, filed on Jul. 30, 2001 now U.S. Pat. No. 6,742,097.

TECHNICAL FIELD

This invention relates to power conservation in memory devices and systems.

BACKGROUND

Dynamically refreshed memory, usually referred to as dynamic random access memory or DRAM, is a type of memory device found in many different computing devices. A typical DRAM device may have millions, billions or even more DRAM memory cells. A DRAM memory cell is commonly formed by a single transistor and an associated capacitance. The capacitance is charged to a voltage that indicates a bit value of either "0" or "1". The capacitance loses its charge rather quickly, bringing about the need for periodic refreshing.

In many computer systems, the power consumption of DRAM memory is insignificant compared to other system components such as hard disks, high-performance microprocessors, active matrix displays, CRTs, etc. However, in other computer systems, such as the newly emerging and evolving class of mobile devices known as "handhelds" or "PDAs" ("personal digital assistants"), the power consumption of the DRAM memory is significant as compared to other components in the computer system. In comparison to many of the more traditional types of computers, such as desktop or personal computers, many mobile computing devices, are smaller, less capable, and use components that consume less power. For example, many of these systems have small, monochromic displays, low performance CPUs, and no hard disks. Some of these mobile systems, furthermore, rely on batteries for their operating power. As a result of these factors, power consumption of memory subsystems has become more of an issue in these devices; there is a strong need to reduce memory power consumption and to thereby extend the time between required battery replacement or recharging.

Memory devices with power management features are becoming available to address this need. For example, DRAMs are available that support various different reduced power modes. However, power savings come at the cost of performance. Typically, a greater penalty in access speed is imposed at each increasing degree of power savings. Thus, decisions regarding whether to invoke power-saving features in a DRAM should be made intelligently. Typically, it is desired to initiate a low power mode in a particular memory device only when that memory device is not currently in use and is not anticipated to be in use in the near future.

It is difficult, however, to anticipate the future need for accessing any particular region of memory. Furthermore, modern operating systems typically allocate memory without regard to memory device boundaries, making it difficult to find a single memory device that can appropriately be set to a reduced power mode without significantly impacting overall system performance. More specifically, typical memory allocation schemes often result in a highly fragmented memory space, with allocated pages of memory spread more or less randomly across the available range of physical memory. Because allocated memory is normally spread across all of the available devices, none of the devices can be put into a reduced power mode without seriously impacting memory performance.

An article entitled "Power Aware Page Allocation," by authors Alvin R. Lebeck, Xiaobo Fan, Heng Zeng, and Carla Ellis, in Proceedings of the Ninth International Conference on Architectural Support for Programming Languages and Operating Systems (ASPLOS-IX) (November, 2000), discusses the desirability of clustering memory page allocations into the minimum number of memory devices. Such clustering allows other devices to be put into reduced power modes.

Described below are specific techniques for minimizing the number of actual DRAM devices being used in a system at any particular time. Such techniques can be implemented in existing systems with very little overhead, while potentially achieving significant power savings.

DETAILED DESCRIPTION

Memory Consolidation by Logical-to-Physical Re-mapping

Figure 1:
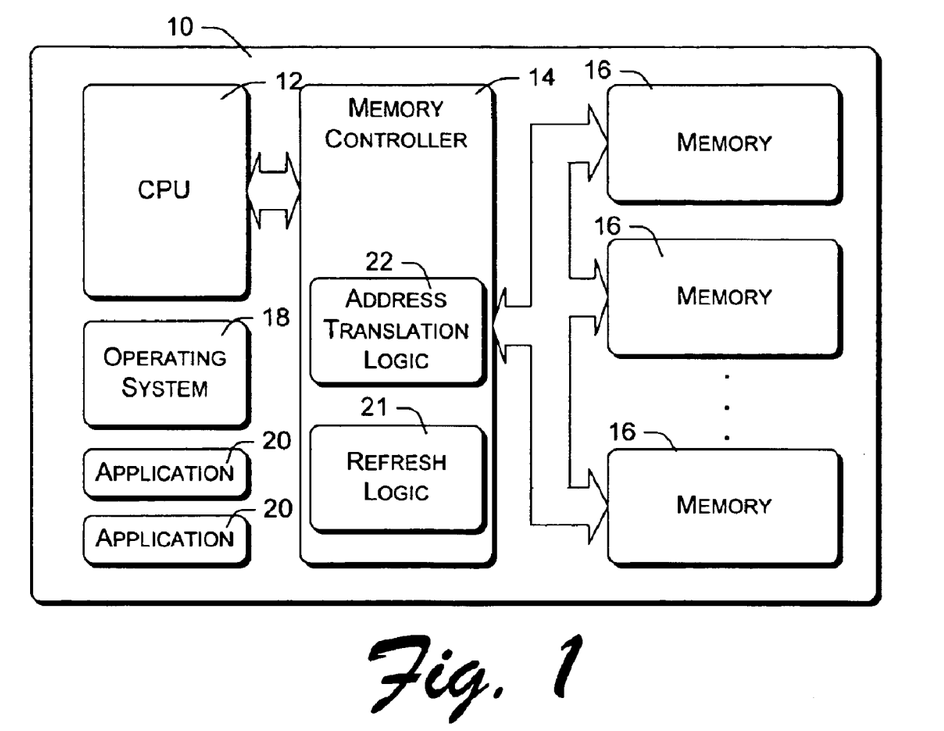
FIG. 1 is a block diagram of a memory system that incorporates aspects of the invention.

FIG. 1 shows pertinent portions of a computer system 10, including a CPU 12, a memory controller 14, and memory devices 16. Although the memory controller and memory devices are shown to be separate entities in this figure, the same techniques apply for memory controllers that are integrated into the CPU, as well as memory that is integrated with either the controller and/or the CPU.

The computer system also includes an operating system 18 and one or more applications or application programs 20. The operating system and applications are typically initially stored on some form of non-volatile memory (not shown). They are subsequently loaded into executable memory and executed by CPU 12. Devices 16 form at least part of the executable memory. In many cases, the computer system implements a virtual memory system, so that only portions of the operating system and applications are actually present in physical memory at any given time.

The architecture of FIG. 1 is typical of many computers and computer-like devices, and is not limited to conventional desktop systems or even to conventional portable computer systems. Many types of devices, such as entertainment and game devices, industrial control devices, and others either use an architecture such as this or can be easily adapted to use such an architecture.

The operating system is typically an off-the-shelf, general-purpose operating system that provides low-level management functions and support for higher-level application programs. However, the operating system might alternatively be a custom application or program designed for a particular, specialized purpose, and might itself perform the specialized functions that would in other cases be performed by separate application programs.

In the described embodiment, memory devices 16 have dynamically refreshable memory cells. Such devices are typically referred to as DRAMs (dynamic random access memory), or DRAM devices. Other types of memory devices can, however, also benefit from the techniques described herein.

Memory devices 16 can be arranged in many different configurations. Typically, memory devices are arranged in sets or ranks, with each device storing a single bit or other portion of a digital word. The bits or portions are then combined or grouped when writing to or reading from a particular memory address. Decisions regarding whether devices are to be operated in reduced power modes are typically made with respect to all of the devices of a particular set or rank. For purposes of discussion, it is assumed that each block 16 in FIG. 1 represents a set or rank of one or more memory devices, which are configured as a group in different power modes.

Memory controller 14 acts as an interface between CPU 12 and memory devices 16. Memory controller 14 has refresh logic 21 that is configured to periodically refresh the memory cells of the memory devices. Although not shown, each of memory devices 16 has multiple dynamically refreshable memory cells, arranged in rows. In operation, memory controller 14 can receive memory instructions from various sources, including but not limited to, operating system 18, CPU 12, a graphics adapter (not shown), and/or other sources. Memory controller 14 responds to the instructions by performing various memory operations such as, for example, reads and writes. When performing a memory operation, the memory controller specifies particular memory cells by means of a physical address or a combination of addresses (such as row and column addresses). For purposes of the following discussion, these memory addresses will be referred to as physical addresses, and the available range of physical memory addresses will be referred to as the physical address space.

Instructions received by memory controller 14 from CPU 12 specify addresses in terms of an address space that is normally referred to as a physical address space, but which for purposes of the following discussion will be referred to as a logical address space. The term "physical address space" will be used to refer to the range of addresses occupied by memory devices 16. In many prior art systems, these two address spaces are equivalent. In the described embodiment, however, there is a variable mapping between logical addresses used between CPU 12 and memory controller 14 and physical addresses used between memory controller 14 and memory devices 16.

The logical address space is a linear range of addresses that is mapped by memory controller 12 to the physical address space occupied by memory devices 16. As will be seen, mappings of the logical address space to the physical address space are variable—they change over time. However, this variability is transparent to the CPU. To the CPU, the logical address space appears simply as a linear address space. All memory references by the CPU are specified in terms of the logical addresses that form the logical address space.

More specifically, memory controller 14 has mapping logic or address translation logic 22 that maps or translates from logical addresses specified in memory instructions to physical addresses used to access physical memory devices 16. Such mapping is performed in a manner that reduces or minimizes the number of physical memory devices or ranks of memory devices that are in use at any given time. After minimizing the number of physical memory devices that are in use, the memory controller sets other memory devices—those that are either unused or are subject to relatively less usage—to reduced power modes.

More specifically, memory controller 14 repeatedly performs actions of (a) identifying portions of the logical address space based on usage, (b) mapping the identified portions of the logical address space to physical memory in a manner that reduces the number of physical memory devices referenced by the identified portions of the logical address space, (c) identifying one or more memory devices that are not referenced by the identified portions of the logical address space, and (d) setting said one or more identified memory devices to one or more reduced power modes. These actions will be described in more detail in the following discussion.

Figure 2:
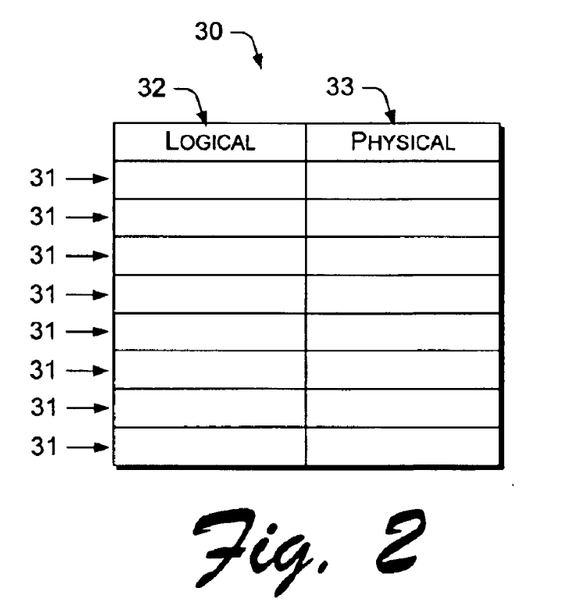
FIG. 2 shows a logical-to-physical mapping table used in conjunction with the memory system of FIG. 1.

FIG. 2 shows a logical-to-physical address translation table 30 such as might be used to implement address translation logic 22. Logical-to-physical address translation can be done on at the byte level (that is, each byte of the logical address space can be mapped to a different byte in the physical address space), but in practice this requires the translation table to be too large. In practice (and in the preferred embodiment), entries of the translation table correspond to groups of bytes in the logical address space (for example, the number of bytes in a physical page, a DRAM page, a DRAM bank, or even a rank of DRAMs). Throughout the remainder of this description, the term "logical page" will be used to represent groups of addresses in the logical address space that map to groups of addresses in the physical address space.

Table 30 has a plurality of mappings or entries 31, each of which indicates a logical page address or number in a first column 32 and a corresponding targeted physical page address or number in a second column 33. For purposes of discussion, a particular physical page address or number will be said to be the "target" of a logical-to-physical mapping whenever there is an entry in table 30 that maps to said particular physical page address or number.

When a received memory instruction specifies a particular logical address or logical page number, memory controller 14 translates it to a physical address or physical page number by referencing the appropriate entry of the address translation table. In accordance with the techniques described herein, memory controller 14 repeatedly and/or periodically modifies the mappings of table 30 to reduce the number of physical memory devices that are targeted by the mappings.

Monitoring Memory Instructions to Identify In-Use Memory

In one embodiment, memory controller 14 identifies highly used portions of the logical address space by monitoring memory instructions and keeping track of which logical addresses or logical memory pages are specified most frequently and/or most recently in the memory instructions. In this embodiment, memory controller 14 is configured to periodically re-map the logical address space to physical memory, to reduce the number of physical memory devices referenced by the identified, highly-used portions of the logical address space. Specifically, the address translation entries are periodically re-calculated so that the most frequently and/or recently used logical memory addresses map to physical memory that is located in the fewest possible number of physical memory devices or ranks. Depending on system constraints which set the maximum power consumption of the memory system, the most frequently and/or recently used logical addresses can be mapped to devices that consume more power (and which have the highest performance), such as devices operating in "Attention" and "Standby" modes available in "Direct RDRAM" memory devices manufactured by Rambus Inc., of Los Altos, Calif. Logical addresses that are used less frequently and/or less recently can be mapped to devices that consume less power (and which have lower performance), such as devices operating in "Nap" or "Powerdown" modes of "Direct RDRAM" memory devices. In conjunction with this re-mapping process, memory content is copied or moved as appropriate so that all logical memory addresses will continue to reference the same data even though the data might now be in a different physical location.

Operating System Notifications of In-Use Memory

In other embodiments, memory controller 14 receives explicit notifications from operating system 18 regarding allocations and de-allocations of memory. These notifications preferably indicate one or more logical memory pages that are being allocated or de-allocated.

Typically, an operating system includes facilities for dynamically allocating and de-allocating memory. When loading an application, for example, an operating system typically designates specific areas of memory for the code of the application and specific areas of memory for use by the program in storing data. Allocation and de-allocation typically involve maintaining one or more tables or other data structures indicating those areas of memory that have been designated for use in this manner. Such areas are typically identified within such tables or data structures by their memory addresses—by their physical memory addresses in most prior art systems, but by their logical addresses in the embodiments described herein.

Memory allocation can also take place as a result of an application program requesting the use of additional memory during actual execution of the application program. In response to requests such as this, the operating system designates areas of memory (which in the described embodiment comprise logical memory) for exclusive use by the requesting application programs.

In operating systems that support virtual memory, allocation of physical memory typically takes place at a lower level. Systems such as this create an individual virtual address space for each of multiple application programs. Each virtual address space is very large—typically much larger than the amount of available physical memory.

In systems such as this, the operating system typically allocates virtual memory to requesting application programs. When such virtual memory is allocated, the operating system creates a translation entry or "mapping" between an allocated range of virtual memory addresses and a corresponding range of physical memory addresses—in the embodiments described herein, each mapping is between a range of virtual memory addresses and a corresponding range of logical memory addresses. Each translation entry or mapping translates from a virtual or source address to a logical or target address. The operating system maintains a translation or mapping table that contains all current translations or mappings.

When an application program subsequently references a virtual memory address, the operating system and CPU use the translation table to translate from the virtual address to the logical address, and the actual memory access is made to the indicated logical address. This translation process is transparent to the application program.

In order to make each virtual address space appear relatively unlimited, the operating system makes use of a mass storage medium such as a hard disk, which is typically referred to as secondary storage or secondary memory to distinguish it from primary or physical memory. Secondary storage is usually relatively slow to access, but normally has a capacity much larger than that of primary memory. The operating system monitors memory usage and when portions of virtual memory are not being used, the data from the corresponding portions of physical memory is moved to secondary storage. Thus, at any given time, some portions of virtual memory will correspond to portions of physical memory, and some virtual memory will correspond to portions of secondary memory.

If an application program attempts to access a portion of virtual memory that is currently held in secondary storage, there will be no appropriate entry in the translation table. This is referred to as a "miss," in response to which the operating system intervenes, loads the appropriate data back into physical memory and creates an appropriate translation entry in the translation table. After this is accomplished, the control is returned to the application program, which accesses the memory in its normal fashion.

The process of moving data between primary and secondary storage is referred to as memory "swapping" and normally takes place on an ongoing basis. As part of this process, the operating system maintains and updates its virtual-to-logical address mappings so that any reference to a virtual memory address will be translated to the appropriate logical address. The virtual-to-logical mappings change frequently in response to memory swapping.

Thus, in systems that support virtual memory, the operating system allocates virtual memory to requesting application programs. Prior to use, however, the operating system loads needed portions of the virtual memory into portions of physical memory, and provides address translations between virtual and logical memory addresses. In systems such as these, logical memory can be considered to be allocated whenever it is the target of an active virtual-to-logical memory mapping as described above. The operating system is configured to notify controller 14 when portions of the logical address space becomes allocated in this fashion.

Regardless of the method of memory allocation, the operating system is configured to identify allocated portions of the logical memory space to controller 14. Specifically, the operating system informs the memory subsystem of the specific addresses or address ranges that are being allocated or de-allocated. These addresses are specified in terms of the logical address space described above, although such addresses would normally be thought of as "physical" addresses from the point of view of the operating system.

In response to receiving a notification of a page allocation, memory controller 14 creates a new mapping or translation entry 31 for use by address translation logic 22. As new mappings are created, they are created in a manner that tends to reduce the number of additional memory devices or ranks targeted by the new mappings. Thus, if possible, the new entry is created so that it targets physical memory from a memory device or rank that is already targeted by an existing translation entry. This tends to consolidate physical memory usage in the fewest possible memory devices, allowing non-targeted memory devices to be set to reduced power consumption modes. If it is not possible to allocate the new page from an already targeted memory device or memory rank, the new translation entry is created so that it targets physical memory from a previously untargeted device or rank, and this device or rank may be restored to a non-reduced power consumption mode.

In response to receiving a notification of a page de-allocation, memory controller 14 deletes the corresponding mapping from table 30. Furthermore, memory controller 14 is configured to periodically re-evaluate its existing memory mappings to ensure that they are targeting the fewest possible number of physical memory devices. The mappings are changed if necessary to achieve this goal, after appropriately copying or moving affected portions of physical memory so that each logical address will continue to reference the same data.

Re-evaluation of current memory mappings can be triggered in different ways. For example, the memory controller might be configured to re-evaluate its logical-to-physical address mappings at periodic intervals. Alternatively, the mappings might be re-evaluated after each memory allocation or de-allocation, after a pre-defined number of memory pages have been de-allocated, after, a pre-defined number of memory references, or whenever the power consumption of the memory system approaches one or more pre-defined or dynamically determined thresholds.

After adding or deleting mappings, or after re-evaluating the mappings as described above, the memory controller identifies any memory devices or ranks of memory devices that are not currently targeted by logical-to-physical memory mappings. The memory controller then sets these memory devices or device ranks to a reduced power consumption mode, such as a nap, standby, or power-down mode. Alternatively, it might be desirable in some embodiments to identify those devices or device ranks that are targeted by relatively few logical-to-physical memory mappings, or by infrequent or non-recent memory accesses, and to set those devices or device ranks to a reduced power mode. Although in these examples the memory controller is responsible for identifying, tracking, and placing devices into a reduced power mode, it is possible for software (such as the operating system) to perform these functions as well.

Use Registers to Indicate In-Use Memory

In yet another embodiment, each memory device includes multiple dynamically changeable use registers such as described in a co-pending U.S. patent application Ser. No. 09/919,361, filed Jul. 30, 2001, entitled "Monitoring In-Use Memory Areas for Power Conservation" by inventors Steven C. Woo and Pradeep Batra, which is hereby incorporated by reference.

Figure 3:
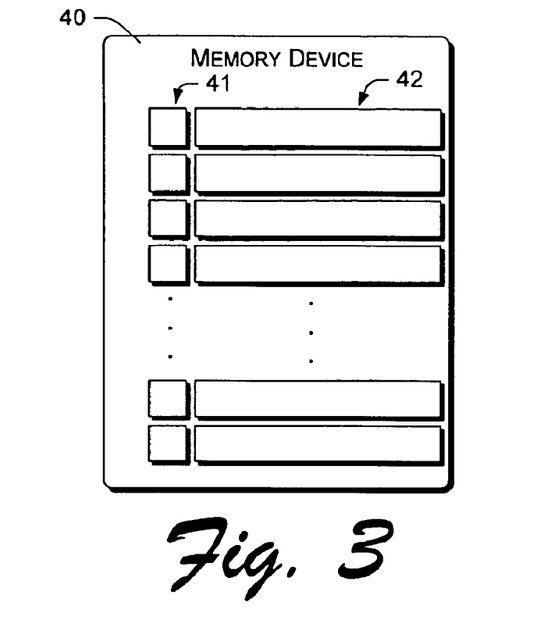
FIG. 3 is a block diagram of a memory device that can be utilized in conjunction with the memory system of FIG. 1.

FIG. 3 shows a memory device 40 that incorporates use registers 41 such as those referred to in the patent application mentioned above. These registers indicate used and unused memory cells or groups of used or unused memory cells. More specifically, use registers 41 in this embodiment comprise individual bits or flags that are associated respectively with individual memory cell rows 42. Each bit or flag is set to indicate whether or not the corresponding row is actually in use, and whether it therefore needs to be refreshed.

Memory controller 14 supports and maintains use registers 41 and allows them to be set or programmed by the operating system to indicate which memory rows are actually in use. For example, the operating system might set the use registers to indicate which rows of logical memory are currently allocated. As described in the previously mentioned patent application, use registers 41 allow power-saving measures to be taken with respect to individual memory rows that are not being used. Specifically, the use registers allow refreshing of unused memory rows to be omitted.

Furthermore, in the described embodiment memory controller 14 monitors use registers 41 to determine which portions of physical memory are in use at any particular time, and periodically modifies logical-to-physical translation table 30 to consolidate in-use memory rows on as few memory devices or memory ranks as possible. Remaining memory devices are then set to reduced power consumption modes such as standby, nap, or power-down modes. Such reduced power modes typically affect entire memory devices or ranks of memory devices, rather than individual rows within such memory devices. However, it is possible that for some designs, reduced power modes may affect portions of memory storage within one or more devices, such as a bank within a DRAM.

In this embodiment, the address translation logic 22 initially implements default logical-to-physical address mappings in table 30 of FIG. 2. Subsequently, memory controller 14 periodically identifies or re-identifies portions of the logical address space that are in use, by examining use registers 41. Furthermore, memory controller 14 periodically re-maps the identified or re-identified portions of the logical address space that are in use, in a manner that reduces the number of physical memory devices or ranks that are referenced by the in-use portions of the logical address space. Prior to re-mapping any particular range of logical addresses, the memory controller moves any memory content that was previously referenced by such logical addresses so that said memory content will continue to be referenced by the same logical addresses after re-mapping.

Although the use registers or flags 41 are shown on an individual memory device for purposes of this example, the registers or flags could be physically located elsewhere. For example, they could be located on the memory controller itself, or on some other component other than the memory controller or memory device. Furthermore, such registers could be made to correspond to ranges of logical memory addresses, rather than to physical address rows as shown in FIG. 3.

Virtual Memory Implementation

Figure 4:
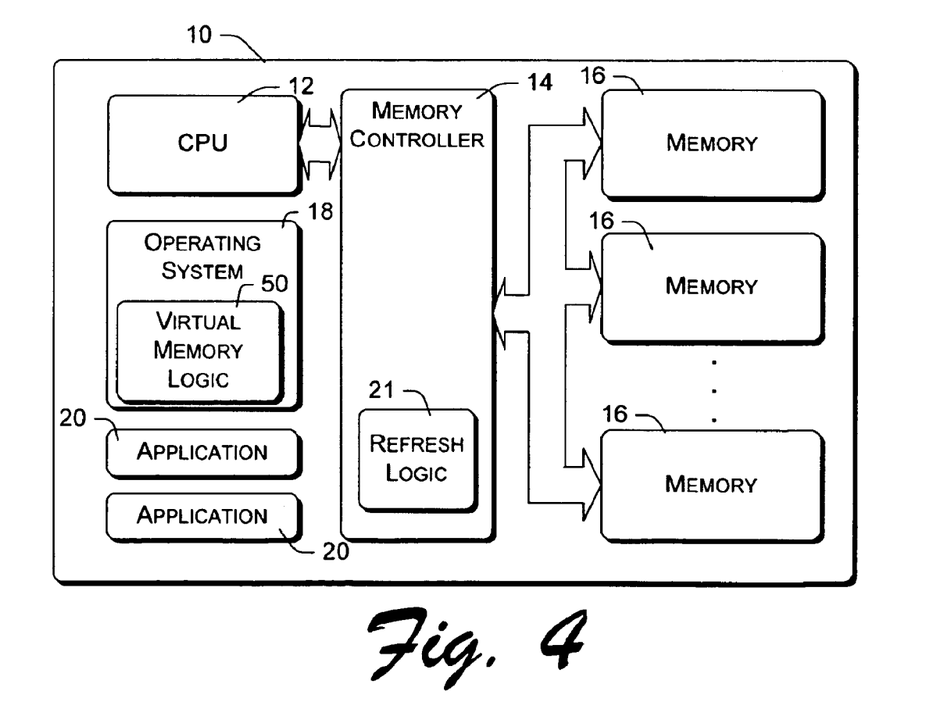
FIG. 4 is a block diagram of an alternative memory system that incorporates aspects of the invention.

FIG. 4 shows another embodiment, in which similar techniques are implemented within a virtual memory system of computer 10. Shown in FIG. 4 is virtual memory logic 50 for implementing a virtual memory system. In systems such as this, the operating system allocates virtual memory to requesting application programs. Virtual memory can reside at times on secondary storage media such as hard disks. Prior to use, however, the operating system loads needed portions of the virtual memory into portions of physical memory, and provides address translations from virtual memory addresses to physical memory addresses. In this embodiment, memory controller 14 does not perform address translations. Thus, CPU 12 specifies actual "physical" addresses to memory controller 14, and the virtual memory system maintains mappings or translations from virtual memory addresses to physical memory addresses. In this embodiment, the virtual address space can be considered to be a "logical" address space, and similar techniques are used to map from this "logical" or "virtual" address space to the physical address space occupied by memory devices 16.

It should be noted that although the virtual memory logic is shown as being implemented within operating system 18, the CPU 12 (and potentially other components) typically also has logic for supporting the implementation of virtual memory. Such CPU logic is typically under the control and supervision of the operating system.

Figure 5:
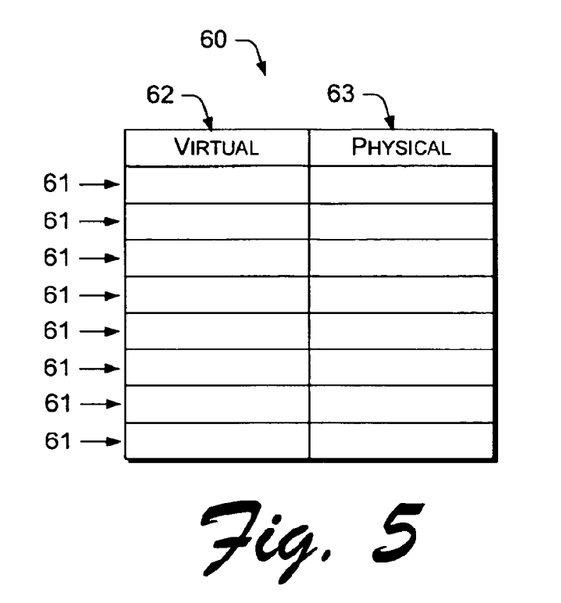
FIG. 5 shows a virtual-to-physical mapping table used in conjunction with the memory system of FIG. 4.

FIG. 5 shows a virtual-to-physical address translation table 60 that forms part of virtual memory logic 50. This table has a plurality of mappings or entries 61, each of which indicates a virtual page address or number in a first column 62 and the corresponding targeted physical page address or number in a second column 63. When referencing a given virtual address or virtual page number, virtual memory logic 50 translates it to a physical address or physical page number by referencing the appropriate entry of the address translation table 60. Virtual memory logic 50 creates a mapping when a corresponding portion or page of virtual memory is loaded into physical memory. When the portion or page of virtual memory is removed from physical memory, the mapping is deleted from table 60. Thus, address translation table 60 is a dynamically changing data structure. At any given time, table 60 reflects only those virtual memory pages that are actually loaded in physical memory. This changes as memory is allocated and de-allocated, and as memory is moved back and forth between secondary storage and physical memory. For purposes of the following discussion, physical memory is considered to be allocated when it is the target of a virtual-to-physical address mapping.

In one implementation, the virtual memory logic 50 of FIG. 4 is configured to periodically and/or repeatedly identify portions of the virtual address space that are in use, and to repeatedly modify the mappings of table 60 to reduce the number of physical memory devices that are targeted by the mappings. This is similar to the previously discussed embodiments, except that these steps are performed in the virtual memory system rather than in the memory controller.

In another implementation, the mappings are created in a manner that tends to minimize the number of in-use physical memory devices. In this implementation, the virtual memory logic 50 manages its free page list so that newly allocated pages are allocated from those memory devices that are already receiving the heaviest usage.

Figure 6:
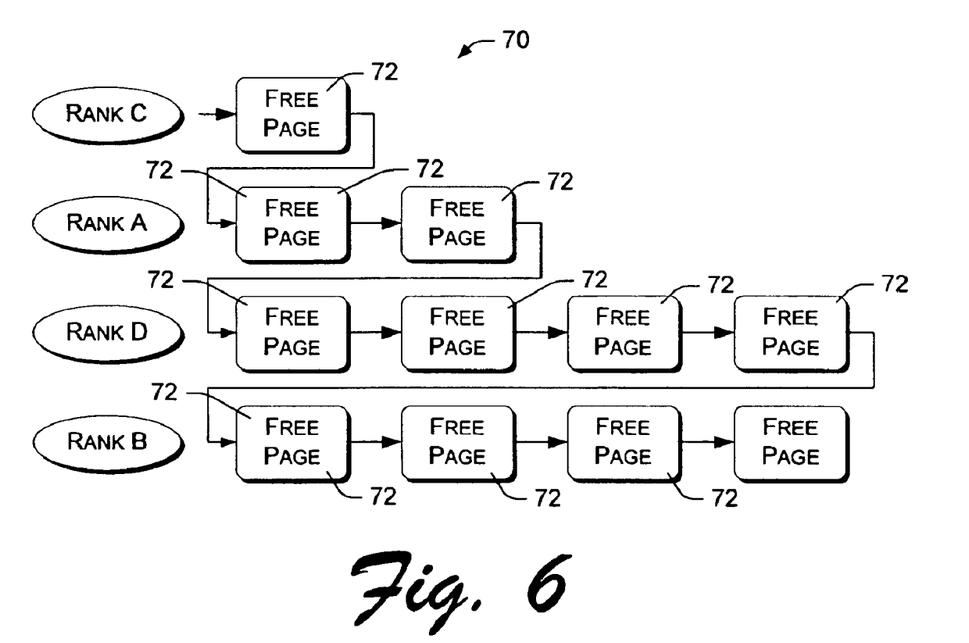
FIG. 6 illustrates a free page list used in conjunction with the memory system of FIG. 4.

FIG. 6 shows a free page or free region list 70 that is maintained by virtual memory logic 50 in accordance with this implementation. This list contains indications of free memory regions or pages—pages that are not currently targeted by any mapping entry in table 60.

Free page list 70 is implemented as a linked list of free page or free region indicators 72. Each free page indicator is a data structure containing a physical address or page number and a pointer to the next indicator in the list (unless the indicator is the last in the sequence).

The free page indicators are grouped, with each group corresponding to a set of one or more physical memory devices. A set of memory devices typically comprises those memory devices whose bits are combined to create a data word of the width supported by the particular memory system architecture, and which would therefore be set as a group to a particular power consumption mode. For example, a set of memory devices might comprise a rank of memory devices. Each group includes free memory indicators corresponding to free memory regions or pages within the corresponding set of physical memory devices.

FIG. 6 shows four groups, corresponding to four different sets or ranks of memory devices, Rank A, Rank B, Rank C, and Rank D, each of which is shown in its own row. Within Rank A, there are two free physical memory pages. The free page indicators corresponding to these two free memory pages are grouped within the linked list, meaning that they are adjacent each other in the linked order. Similarly, Rank B has four free pages, which are grouped or located adjacent in the linked list.

Within the linked list, the indicators are sorted by group, in an order that is based on the relative current memory allocations from the corresponding sets of physical memory devices. More specifically, the groups are sorted in order from the group corresponding to the memory rank having the most memory allocations to the group corresponding to the memory rank having the fewest memory allocations. In some cases, this is equivalent to an order beginning with the group having the fewest free pages to the group having the most free pages.

In the example of FIG. 6, the first group in the sorted order corresponds to the memory rank having the fewest number of free pages, which is Rank C. The second group corresponds to the memory rank having the second fewest number of free pages, which is Rank A. The last group in the order is that group having the highest number of free pages, which in this example are Rank D and Rank B.

When allocating physical memory, the memory is allocated in the order of the sorted free region list, so that physical memory is allocated preferentially from those sets of physical memory devices having relatively higher current allocations of memory regions. In the example of FIG. 6, memory is allocated first from Rank C, then from Rank A, then from Rank D, and then from Rank B if necessary.

The sorting is preferably repeated periodically, as new physical memory pages become available.

Allocating memory in this manner tends to consolidate memory usage on relatively fewer physical memory devices. Periodically, the operating system or virtual memory system identifies those ranks or devices having relatively fewer memory allocations—those with the largest number of free pages, at the bottom of the free region list—and sets those devices to reduced power modes. In some cases, it might be desirable to identify only those memory devices or ranks that have no current allocations, and to set only those devices to the reduced power mode. In other cases, it is desirable to identify those memory devices or ranks that have the least frequently and/or least recently accessed memory locations, and set these devices to a reduced power mode.

In order to implement the described free page management technique, the operating system will typically be configured with information regarding the physical layout of memory, such as the address boundaries of memory ranks. This information is used to determine the different groups of free page indicators. Information regarding physical memory layout can be provided in different ways. For example, the memory controller might be designed to support queries regarding memory layout. In this case, the operating system would simply query the memory controller for this information. Alternatively, memory layout information might be provided by an operator as initial set-up information when configuring a computer. As yet another alternative, memory layout information may be provided as part of the system BIOS.

Although the technique of free page management has been described in the context of an operating system and its virtual memory subsystem, similar free page management techniques can be applied in the embodiments described with reference to FIGS. 1–3, in which a hardware-based memory controller creates mappings from a logical address space to actual physical memory devices. Specifically, a memory controller can maintain a sorted free page list corresponding to free pages of physical memory. When creating new logical-to-physical address mappings, the controller can create the mappings to first target those physical memory pages at the top of the sorted list, to ensure that physical memory is used first from those devices that are already heavily utilized.

Furthermore, it is recognized that the described techniques can in many cases be implemented alternatively in software, hardware, or a combination of both. In the case of software, an implementation might comprise one or more computer-readable storage media containing instructions and instruction sequences that are executable by a processor to perform the actions and techniques described above. In the case of hardware, the same or similar actions might be implemented as non-instruction-based logic components embodied on a hardware substrate such as a circuit board or silicon chip.

CONCLUSION

The techniques described above can be used in many systems to produce significant power savings. Furthermore, such power savings will often have few or no detrimental side-effects, because the power-saving measures are taken with respect to memory areas that are not actually being used or that are being used relatively lightly. The described techniques can therefore avoid or greatly diminish the prior art tradeoff between access speed and power savings.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. A method comprising:
   creating mappings from received addresses to physical memory by a hardware interface disposed between a processor and a number of physical memory devices; and
   modifying the mappings by the hardware interface to reduce the number of physical memory devices that are targeted by the mappings.

2. The method as recited in claim 1, further comprising receiving memory instructions from a processor or graphics adapter by the hardware interface.

3. The method as recited in claim 1, wherein the mapping are modified at the hardware interface independently of the operating system.

4. The method as recited in claim 1, further comprising refreshing the content of physical memory devices by the hardware interface independently of the operation system.

5. The method as recited in claim 1, further comprising:
   identifying one or more of the plurality of memory devices referenced by relatively few mappings; and
   setting the identified one or more of the plurality of memory devices to a reduced power state.

6. The method as recited in claim 1, wherein the received addresses are specified by a processor in terms of a physical address space, further comprising:
   identifying portions of the processor's physical address space based on usage;
   re-mapping the identified portions of the processor's physical address space to physical memory by the hardware interface in a manner that reduces the number of physical memory devices referenced by the identified portions of the processor's physical address space; and
   prior to re-mapping, moving the corresponding memory content so that the corresponding memory content will continue to be referenced by the same received address.

7. The method as recited in claim 6, wherein the re-mapping is periodically performed after a pre-defined number of memory references.

8. The method as recited in claim 6, wherein the re-mapping is performed after power consumption by the physical memory reaches a determined threshold.

9. The method as recited in claim 6, wherein the re-mapping is periodically performed after a pre-defined number of memory allocations.

10. The method as recited in claim 6, wherein the re-mapping is performed at periodic time intervals.

11. A memory controller comprising:
    means for receiving memory instructions from a processor that specifies memory addresses in terms of a logical address space;
    means for identifying portions of the logical address space based on usage; and
    means for mapping the identified portions of the logical address space to physical memory in a manner that reduces the number of physical memory devices referenced by the identified portions of the logical address space.

12. A memory controller as recited in claim 11, wherein the means for identifying include means for monitoring the memory instructions to determine more frequently used portions of the logical address space.

13. A memory controller as recited in claim 11, wherein the means for identifying include means for monitoring the memory instructions to determine more recently used portions of the logical address space.

14. A memory controller as recited in claim 11, wherein the means for identifying include means for receiving notifications regarding logical memory allocations and de-allocations.

15. A memory controller as recited in claim 11, wherein the means for identifying include means for receiving notifications regarding actual usage of logical memory addresses.

16. A memory controller as recited in claim 11, wherein the means for identifying action include means for maintaining one or more in-use registers indicating whether corresponding portions of physical memory are currently in use.

17. A memory controller as recited in claim 11, further comprising:
    means for identifying one or more memory devices that are not referenced by the identified portions of the logical address space; and
    means for setting said one or more identified memory device to a reduced power mode.

18. A memory controller as recited in claim 11, further comprising:
    means for identifying one or more physical memory areas that are relatively infrequently referenced by the identified portions of the logical address space; and
    means for setting said one or more physical memory areas to a reduced power mode.

19. A memory controller as recited in claim 11, further comprising:
    means for periodically repeating the identifying and mapping actions to repeatedly reduce the number of physical memory devices referenced by the identified portions of the logical address space; and
    means for moving affected portions of physical memory so that each logical address continues to reference the same data prior to any repeated mapping action.

20. The memory controller as recited in claim 11, wherein the means for identifying include means for identifying portions of the processor's physical address space based on frequency of usage.

21. The memory controller as recited in claim 11, wherein the means for identifying include means for identifying portions of the processor's physical address space based on most recent usage.

22. A method of managing memory, comprising:

monitoring memory accesses received from a processor to identify portions of the processor's address space based on usage; and periodically re-mapping the processor's address space to physical memory to reduce the number of physical memory devices referenced by the identified portions of the processor's address space.

23. A method as recited in claim 22, wherein the monitoring comprises monitoring the memory instructions to determine more frequently used portions of the processor's address space.

24. A method as recited in claim 22, further wherein the monitoring comprises monitoring the memory instructions to determine more recently used portions of the processor's address space.

25. A method as recited in claim 22, further comprising:

receiving memory instructions that reference memory in terms of the processor's address space; and monitoring the memory instructions to identify the portions of the processors address space.

26. A method as recited in claim 22, wherein the identified portions of the processor's address space are those portions that are used least frequently, further comprising:

identifying one or more memory devices that are not referenced by the identified portions of the processor's address space; and setting said one or more identified memory devices to a reduced power mode.

27. A method as recited in claim 22, wherein the identified portions of the processor's address space are those portions that are used least frequently, further comprising:

identifying one or more physical memory areas that are not referenced by the identified portions of the processor's address space; and setting said one or more physical memory areas to a reduced power mode.

28. A method as recited in claim 22, further comprising:

prior to any re-mapping action, moving affected portion of physical memory so that addresses received from the processor continues to reference the same data.

29. A system comprising:

an operating system configured to dynamically allocate memory from a logical address space and to identify allocated portions of the logical address space to a memory controller;

the operating system further configured to dynamically de-allocate memory from the logical address space and to identify the de-allocated portions of the logical address space to the memory controller;

wherein the memory controller is configured to map allocated portions of the logical address space to corresponding portions of physical address space in a manner that tends to reduce the number of physical memory devices referenced by the allocated portions of the logical address space; and the memory controller further configured to move portion of memory regions corresponding to allocated portions of the logical address space in response to identification of de-allocated portions of the logical address space and re-mapping the corresponding portions of the physical address space and corresponding portion of the logical address space to reduce the number of physical memory devices referenced by allocated portion of logical memory.

30. The system as recited in claim 29, further comprising:

identifying one or more of a plurality of memory devices having relatively lower allocated portions of memory regions; and setting the identified one or more of the plurality of memory devices to a reduced power state.

31. The system as recited in claim 29, further comprising:

identifying one or more of the plurality of memory devices based on relatively lower usage; and setting the identified one or more of the plurality of memory devices to a reduced power state.

32. The system as recited in claim 31, wherein identifying one or more of the plurality of memory device based on relatively lower usage comprises monitoring memory instructions to determine relatively less frequently used portions of the physical address space.

33. The system as recited in claim 31, wherein identifying one or more of the plurality of memory device based on relatively lower usage comprises monitoring memory instructions to determine relatively least recently used portions of the physical address space.

34. A memory management system comprising:

means for maintaining a free region list indicating free memory regions for potential allocation from physical memory devices;

means for sorting the free region list in an order that is based on the relative current allocations of memory regions from respective sets of one or more physical memory devices; and means for allocating memory regions indicated by the sorted free region list on the sorted order so that the memory regions are allocated preferentially from those physical memory devices having higher relative current allocations of memory regions.

35. A memory management system as recited in claim 34, further comprising:

means for identifying one or more memory devices having relatively lower current allocations of memory regions; and means for setting said one or more identified physical memory devices to a reduced power mode.

36. A memory management system as recited in claim 34, further comprising means for maintaining the free region list as a linked list of free region indicators.

37. A memory management system as recited in claim 34, further comprising means for repeatedly re-sorting the free region list in said order.

* * * * *